United States Patent [19]
Miller et al.

[11] Patent Number: 5,920,701
[45] Date of Patent: Jul. 6, 1999

[54] SCHEDULING DATA TRANSMISSION

[75] Inventors: C. Kenneth Miller, Concord; Terrance E. Bradley, Hopkinton, both of Mass.; Kenneth Cates, Salem, N.H.; Kary Robertson, Newburyport, Mass.

[73] Assignee: StarBurst Communications Corporation, Concord, Mass.

[21] Appl. No.: 08/704,115

[22] Filed: Aug. 28, 1996

Related U.S. Application Data

[63] Continuation-in-part of application No. 08/585,948, Jan. 16, 1996, Pat. No. 5,727,002, which is a continuation-in-part of application No. 08/375,493, Jan. 19, 1995, Pat. No. 5,553,083.

[51] Int. Cl.⁶ ................................................. H04L 12/00
[52] U.S. Cl. ........................................................ 395/200.58
[58] Field of Search ................... 370/61, 92; 395/200.3, 395/200.53, 200.59, 200.58

[56] References Cited

U.S. PATENT DOCUMENTS

| | | | |
|---|---|---|---|
| 4,491,947 | 1/1985 | Frank et al. | 370/323 |
| 4,642,758 | 2/1987 | Teng | 707/10 |
| 4,979,165 | 12/1990 | Dighe et al. | 370/416 |
| 5,070,453 | 12/1991 | Duffany | 364/402 |
| 5,404,505 | 4/1995 | Levinson | 707/10 |
| 5,452,450 | 9/1995 | Delory | 395/600 |
| 5,491,691 | 2/1996 | Shtayer et al. | 370/395 |
| 5,696,764 | 12/1997 | Soumiya et al. | 370/395 |

FOREIGN PATENT DOCUMENTS 0632671  1/1995  European Pat. Off. ........ H04L 29/06

OTHER PUBLICATIONS

"TRIView Manger" brochure by Tactix ReEngineering, four pages.

*Primary Examiner*—David Y. Eng
*Attorney, Agent, or Firm*—Testa, Hurwitz & Thibeault, LLP

[57] ABSTRACT

The transmission of data (e.g., a computer file) from one or more content sources over a network to one or more replicated servers is scheduled and performed according to the schedule. The content sources request the schedule from a network resource scheduler. The scheduler receives the requests and determines if and how the various requests can be accommodated. The scheduler determines at least a start time and a transfer rate for each of the content sources that can be accommodated.

24 Claims, 8 Drawing Sheets

SCHEDULING DATA TRANSMISSION

CROSS-REFERENCE TO RELATED APPLICATIONS

This application is a continuation-in-part of U.S. patent application Ser. No. 08/585,948, filed on Jan. 16, 1996, and issued on Mar. 10, 1998 as U.S. Pat. No. 5,727,002, which is a continuation-in-part of U.S. patent application Ser. No. 08/375,493, filed on Jan. 19, 1995, and issued on Sep. 3, 1996 as U.S. Pat. No. 5,553,083. The entirety of each of these two copending patent applications are incorporated by reference.

TECHNICAL FIELD

This invention relates to scheduling multicast data transmission.

BACKGROUND INFORMATION

Computer network communication has grown in recent years. For example, the number of Internet users in 1995 was twenty-four million, and the growth rate is about ten to fifteen percent each month. This growth has been fueled, in part, by the ease of accessing the World Wide Web (WWW), a portion of the Internet that allows users all over the world to obtain a variety of information from Web sites. Such rapid growth, combined with the decentralized nature of the Internet, has lead to congestion on the Internet. This congestion has been called "cybercrawl," and it has led to a desire for solutions that are more cost effective than simply adding network infrastructure. Some new alternative network providers are looking at reliable multicast transmission to be a key technology that can be used to minimize network traffic while at the same time distributing replicated web servers to the edges of the network for improved response times for the user. This minimizes backbone traffic by keeping traffic as localized as possible, while also improving response to the user by distributing server resource and keeping the queries and responses from user to server on a minimal transmission path. Virtually all networks desirous of this new method to gain efficiency have multiple content sources that they wish to replicate to the edges of the network. A major problem is one of coordination. How can the content be distributed by many content providers so that the distributions do not overwhelm network bandwidth, and how can multicast addresses be allocated without conflict among the various content sources?

SUMMARY OF THE INVENTION

It is an object of the present invention to coordinate the transfer of data to replicated sites from multiple content sources such that network resources are optimally utilized. Examples of network resources to be optimized are network bandwidth and the number of multicast addresses available for use.

In accordance with the invention, a network resource scheduler (hereinafter "scheduler") receives requests from one or more content sources requesting data transmission to one or more replicated servers. The scheduler is coupled to a computer network such as a Wide Area Network (WAN), a Local Area Network (LAN), the Internet, a wireless network (e.g., a cellular data network), or a satellite network. In accordance with the invention, the network is multicast enabled, i.e., multicast addresses are used and are routed through the network by the network infrastructure. The content sources transmit data (e.g., one or more computer files) to the replicated servers pursuant to one or more distribution schedules generated by the scheduler. The scheduler creates the distribution schedules based on the requests from the content sources, which requests typically include the size or amount of the data to be transmitted, the desired completion time for the data transmission, and a priority level associated therewith. In one embodiment, the distribution schedules are determined based on a predetermined start time which is a time at which data transmission from each of the requesting content sources will commence.

In creating the distribution schedules, the scheduler, in one exemplary embodiment, obtains requests from the content sources and sorts the high priority requests so that their distribution schedules can be determined first. The scheduler obtains from each high priority content source, the amount of data requested for transmission and adds the respective amounts to obtain the total amount of content data requested for transmission. The scheduler then determines a proportional bandwidth factor and a delivery factor for each high priority content source. After making such determinations, the scheduler determines the amount of bandwidth available for content data transmission at times surrounding the desired completion time and also the duration of time that such amount of bandwidth is available. After obtaining the available bandwidth, the scheduler determines the transfer rate for each source using the available bandwidth, the proportional bandwidth factor and the delivery factor. The total transmission time is then determined for each high priority content source using the transfer rate, the amount of data to be transmitted, and an overage factor which is indicative of the likelihood of errors occurring during transmission. After the distribution schedules have been determined for the high priority content sources, distribution schedules for the low priority content sources are determined in the manner described above. The distribution schedules transmitted to the content sources generally include at least a data transmission start time and a data transfer rate.

In the event that the total transmission time required for a content source to transmit its data by the completion time is greater than an available transmission time determined for that content source, the scheduler notifies the content source in question that its request is denied or that only some of the data requested can be transmitted. In response, the content source may request a new delivery time and the scheduler will then re-determine the distribution schedule for that content source, or the content source may indicate that its request should be accommodated. If the content source indicates that its request should be accommodated, the scheduler retrieves data relating to the emergency overage bandwidth available at times surrounding the delivery time. If emergency overage bandwidth is available, the scheduler re-determines the distribution schedules for such content sources and makes another determination about whether the distribution schedules can be accommodated within the time period that transmission is available.

In the event that the distribution schedules can be accommodated, the scheduler determines whether a sufficient number of addresses, preferably multicast addresses, exist. If the number of content sources, and thus the number of distribution schedules, are greater than the number of available addresses, the scheduler determines whether any additional addresses have recently become available for reuse. If none have become available or if the number of addresses still remains less than the number of distribution schedules, all the requests cannot be accommodated and the addresses are assigned only to the content sources having a high priority level.

The distribution schedules that can be accommodated are then transmitted to certain of the requesting content sources. Each of the content sources begins a transmission, preferably a multicast transmission in accordance with the scheme described in the later-filed incorporated-by-reference copending patent application, to the replicated servers at the scheduled start time using the transfer rate set forth in the distribution schedule. After the content sources have transmitted the data, each sends a notification of completion to the scheduler which indicates whether the transmission was successful or unsuccessful. If the transmission was successful and it occurred ahead of schedule, the scheduler may adjust the distribution schedules of other content sources by either assigning a higher transfer rate or by allowing certain content sources to transmit more data if their request for transmission had only been granted in-part. If the transmission was unsuccessful, the notification includes causation data that indicates why the transmission was unsuccessful (e.g., a link outage, a lack of resources at the replicated servers, an excessive error rate, etc.). Using such data, the scheduler can adjust the distribution schedules to ensure that content sources having a high priority level can complete transmission by the delivery time.

Having generally described the invention and one exemplary embodiment thereof, a further summary of the invention is now provided.

In one aspect, the invention relates to a system and a related method for coordinating data transmission over a computer network. With this system and related method, the availability of network bandwidth for data transmission by one or more content sources on the network is obtained. Each content source has a priority. This function (and generally all of the functionality of this system and the steps of the related method) is performed by a network resource scheduler. Prior to the obtaining step, a person such as an operator or network manager typically has used the network resource scheduler to set the availability. The operator, network manager, or other person typically also sets at the network resource scheduler various other parameters and information (e.g., content source priority level) that the network resource scheduler obtains and then uses to create the distribution schedules. After the obtaining step, transmission request information is received at the network resource scheduler from each of requesting ones of the content sources. This transmission request information includes (i) a requested delivery time for data transmission and (ii) the amount of the data to be transmitted. The network resource scheduler then determines, based on at least the priority of the requesting content sources and at least some of the transmission request information from each requesting content source, network bandwidth available to each requesting content source such that data transmission by each requesting content source is completable by the requested delivery time. The network resource scheduler then sends to each requesting content source (i) the time to begin data transmission and (2) the rate at which to transmit the data. Each requesting content source then preferably performs a multicast transmission in accordance with the scheme described in the later-filed incorporated-by-reference copending patent application. In this aspect of the invention, at least one of the content sources can be co-resident with the network resource scheduler.

It is noted that in general the terms "transfer," "transmit," "transmission," "distribute," "distribution," "deliver," "delivery," etc. are used herein interchangeably to identify the same thing, namely, the transfer of data across a computer network or communications link.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1:
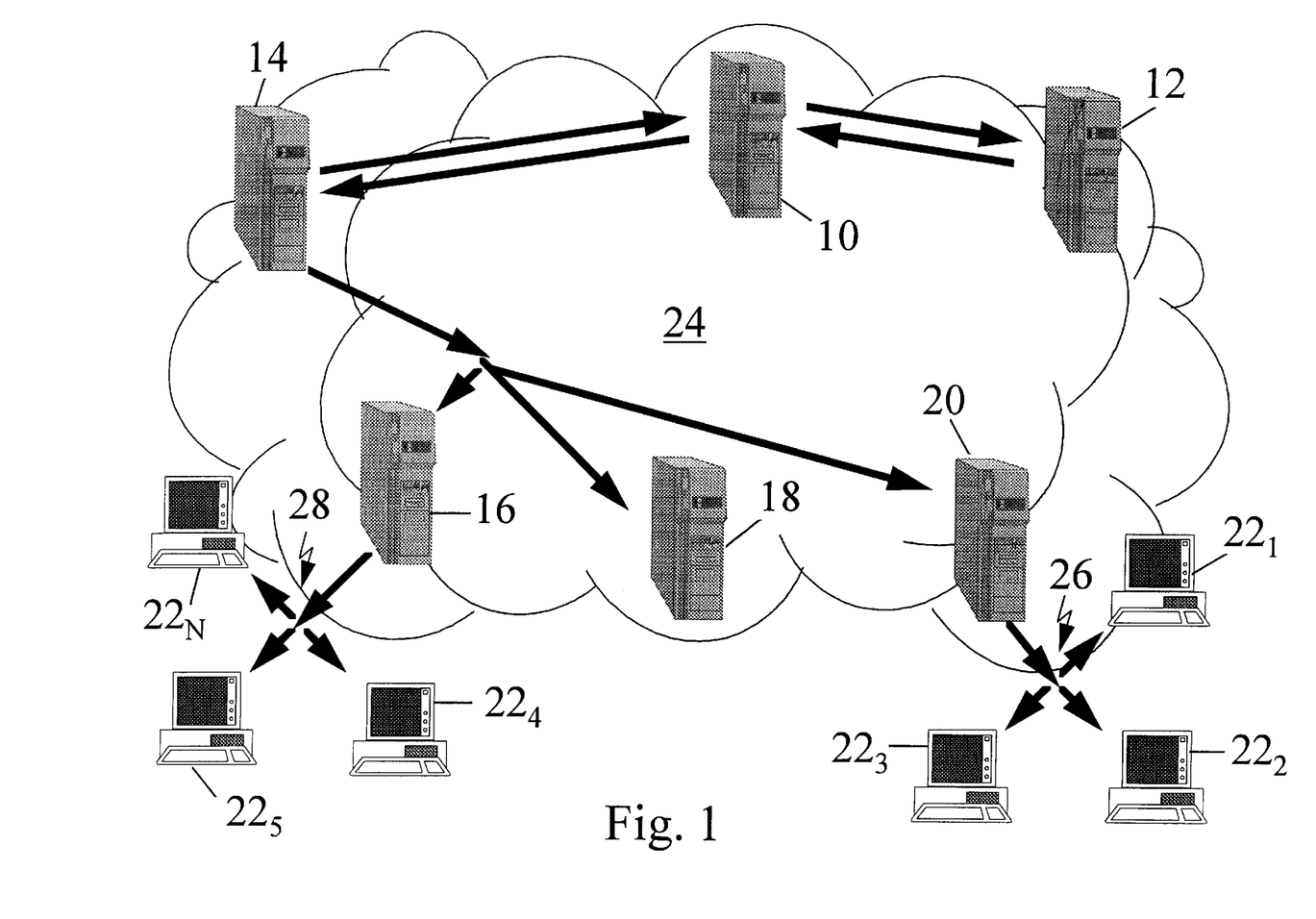
FIG. 1 is an embodiment of a system according to the invention.

Referring to FIG. 1, in accordance with the invention, a network resource scheduler 10 (hereinafter "scheduler") communicates with a plurality of content sources 12, 14 over a communications network 24 and schedules data transmission from the content sources 12, 14 to one or more replicated servers 16, 18, 20. In general, the scheduler 10 determines whether data transmission from one or more of the content sources 12, 14 to one or more of the replicated servers 16, 18, 20 can be completed over the communications network 24 by a delivery time requested by the content sources 12, 14. In accordance with the invention, the transmission from the content sources 12, 14 to the replicated servers 16, 18, 20 is preferably a multicast transmission. As further described below, the scheduler 10 makes the transmission determination based on such parameters as the bandwidth available for data transmission over the communications network 24, the time available for transmission to be completed by the requested delivery time, the amount or size of the data to be delivered by the requested delivery time, the availability of multicast addresses, and the transmission priority levels accorded to the content sources 12, 14. Data delivered to the replicated servers 16, 18, 20, can be retransmitted to one or more subscribers $22_1, 22_2, 22_3, \ldots 22_N$ of the content sources 12, 14 over further communications networks 26, 28.

Although only certain numbers of content sources, replicated servers, and subscribers are shown in FIG. 1, it should be noted that in general, any number of sources, servers, and subscribers are possible. Only two sources 12, 14, three replicated servers 16, 18, 20, and six subscribers 22 are shown in FIG. 1 for clarity and as an example.

Each of the communications networks 24, 26, 28 can be a computer network such as, for example, a WAN, a LAN, the Internet, a wireless network (e.g., a cellular data network), a satellite network, some combination of these types of communication mediums, or some other communication medium. For purposes of discussion, the communications networks 24, 26, 28 will hereinafter be referred to as networks. The scheduler 10 and the content sources 12, 14 are typically located at different nodes on the network 24. In another embodiment, the scheduler 10 and one or more content sources 12, 14 can reside at the same node on the network 24. The replicated servers 16, 18, 20 can be located on the network 24 where the scheduler 10 and content sources 12, 14 reside, as shown in FIG. 1, or on an alternative network (not shown) that ties into the network 24.

The content sources 12, 14 are typically information providers such as, for example, USA Today, Barrons, Sports Illustrated, or other print publishers that are expanding to provide electronic content and are expected to produce a large amount of traffic toward subscribers. The data transmitted from the content sources 12, 14 typically takes the form of a plurality of data frames or data packets which together constitute a computer file. The replicated servers 16, 18, 20 generally act as local content sources that allow subscribers $22_1, 22_2, 22_3, \ldots 22_N$ to quickly obtain content data locally, that is, on the network nearest to the subscribers $22_1, 22_2, 22_3, \ldots 22_N$. The replicated servers 16, 18, 20, in performing this function, aid the subscribers $22_1, 22_2, 22_3, \ldots 22_N$ in avoiding distant or more congested networks. The content sources 12, 14 typically and preferably perform a multicast transfer of data to the replicated servers 16, 18, 20, which in turn, perform a multicast transfer of data to subscribers $22_1, 22_2, 22_3, \ldots 22_N$. The multicast transfer preferably is carried out as described in the commonly-owned, incorporated-by-reference, related, copending patent application Ser. No. 08/585,948 which is identified above.

Figure 2:
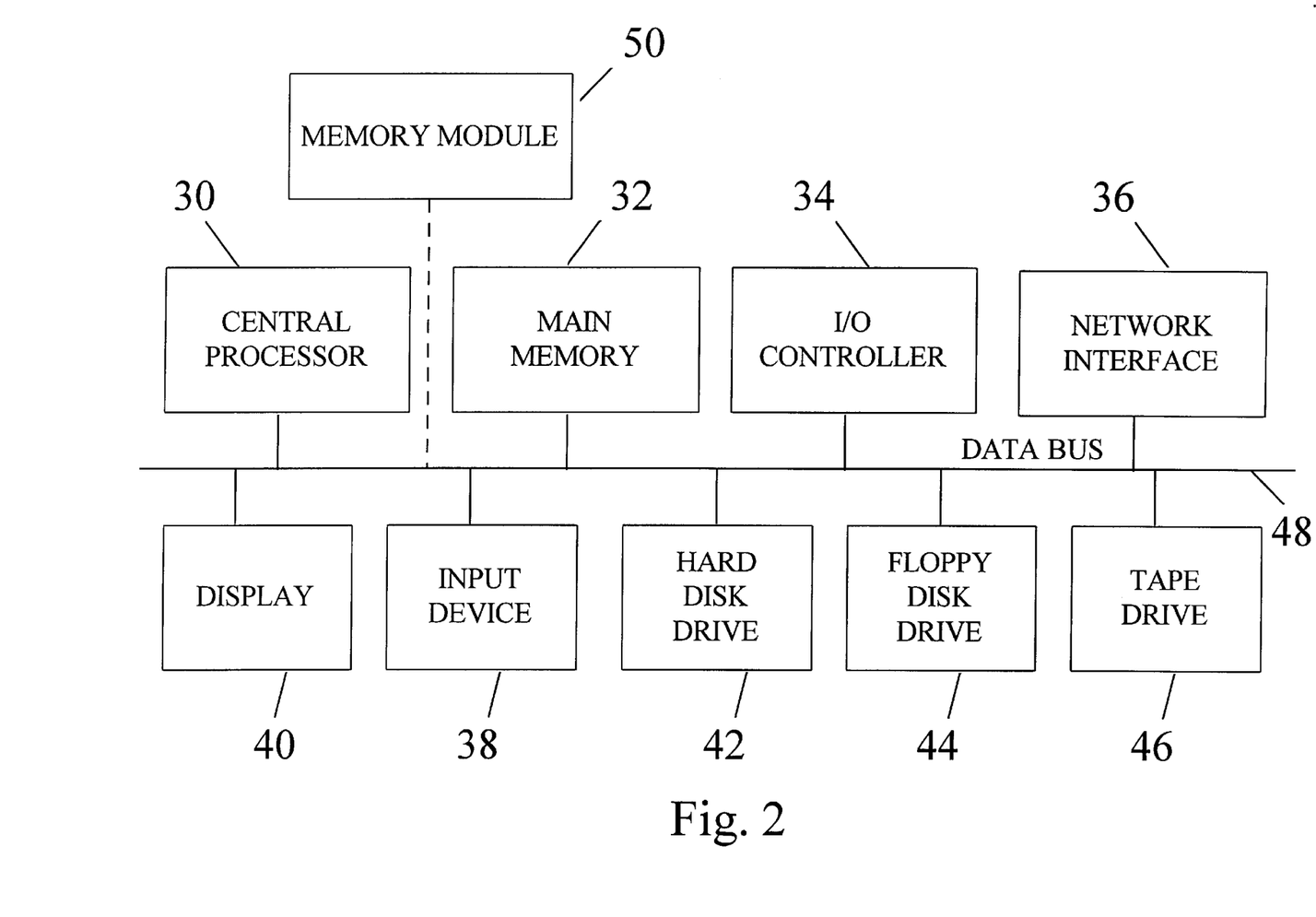
FIG. 2 is a block diagram of a general purpose programmable computer in which at least a portion of the invention can be embodied.

The scheduler 10, content sources 12, 14, replicated servers 16, 18, 20, and subscribers $22_1, 22_2, 22_3, \ldots 22_N$ can be computers, such as PCs or workstations, running any one of a variety of operating systems. Referring to FIG. 2, the scheduler 10, content sources 12, 14, and replicated servers 16, 18, 20 each typically include a central processor 30, a main memory 32 for storing programs and/or data, an input/output controller 34, a network interface 36, one or more input devices 38 such as a keyboard or mouse, a display device 40, a fixed or hard disk drive unit 42, a floppy disk drive unit 44, a tape drive unit 46, and a data bus 48 coupling these components to allow communication therebetween. The content sources 12, 14, and replicated servers 16, 18, 20 typically include an additional memory module 50 for storing content data. The subscribers $22_1, 22_1, 22_2, 22_3, \ldots 22_N$ may include some or all of the above-noted components.

In one embodiment, the main memory 32 of the scheduler 10 contains data relating to the "pathway" bandwidth available for the network 24, the percentage bandwidth to be made available for content data transfer according to the time of day, the emergency overage bandwidth to be made available for content data transfer according to the time of day, and the availability of multicast addresses. Some of the data in the main memory 32 (e.g., bandwidth availability and emergency overage) is placed there by actions of a network manager or operator that uses or is responsible for the scheduler 10. The availability of multicast addresses varies according to the time of day, and according to the type of session for which they are assigned, i.e., semi-permanent sessions or independent sessions. The multicast addresses assigned to certain content providers for semi-permanent sessions are generally not available to other content providers, whereas the multicast addresses assigned on a session-by-session basis are generally available to any content provider after completion of use by a prior content provider. The scheduler 10 may also retrieve data relating to the priority levels assigned to the content sources 12, 14 from main memory 32.

Figure 3:
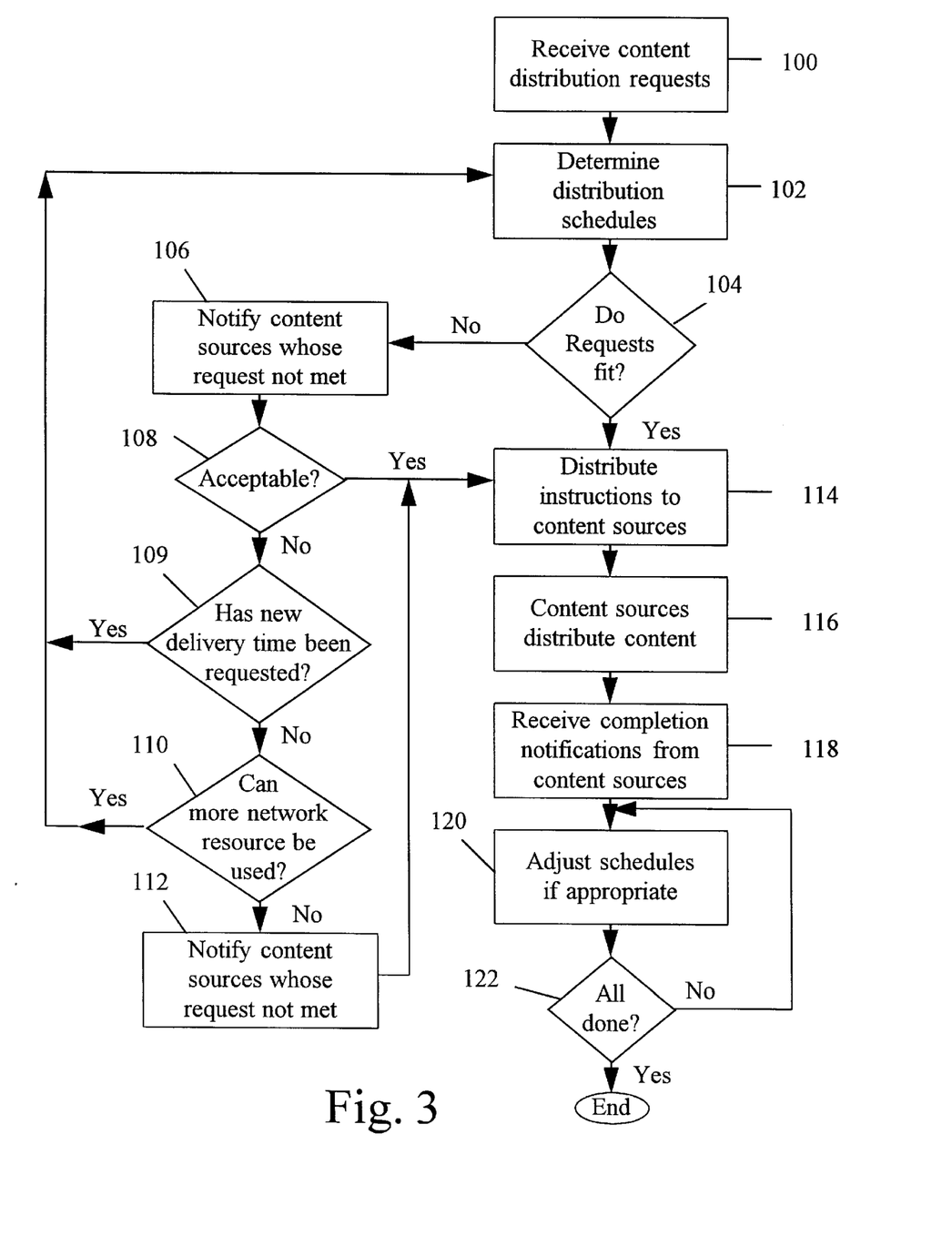
FIG. 3 is a flowchart of a process of scheduling data transmission operations.

Referring to FIG. 3, the scheduling of data transmission form the content sources 12, 14 to the replicated servers 16, 18, 20 commences in step 100 with the scheduler 10 receiving signals via the network from the content sources 12, 14. The signals notify the scheduler 10 of the existence of data, as well as the transfer parameters of the content source 12, 14. An example of a transfer parameter is the desired delivery time. The delivery time can be a randomly occurring time or a periodically occurring time (e.g., eight o'clock a.m. daily, twelve o'clock a.m. on the first day of every month). The desired delivery time is typically set by the content sources 12, 14, and could represent the time when the replicated servers 16, 18, 20 require data updates. For example, if a content source 12, 14 provides news stories, the replicated servers 16, 18, 20 will require updates on an hourly or a daily basis. Similarly, if a content source 12, 14 provides an on-line magazine, the replicated servers 16, 18, 20 will require updates on a weekly or monthly basis. Therefore, the content source 12, 14 will set a desired delivery time depending on the frequency at which an update is needed. The central processor 30 at each content source 12, 14 is preferably configured to transmit a request signal at a time prior to the desired delivery time, thereby giving the scheduler 10 enough time to receive the request signal, make appropriate determinations, and notify the content source 12, 14 as to whether the request can be accommodated.

Referring again to step 100, each request signal typically includes data relating to: the time the request was made, the desired time at which delivery is to be completed, the size of the content data, in bytes, to be transferred to the replicated servers 16, 18, 20, and the priority level assigned to the content source 12, 14. In another embodiment, the request signal can further include a security level associated with the data to be transmitted, and group public security keys may be distributed by the scheduler 10 to the content sources 12, 14 for use during the transmission. Additionally, each content source 12, 14 can transmit identifying information for authentication by the scheduler 10 as a legitimate content source 12, 14. A legitimate content source 12, 14 can be a content source 12, 14 that has previously registered with the scheduler 10 or a source that transmits registration data concurrently with the transmission of a request to the scheduler 10.

The priority level for each content source 12, 14 is assigned based on some criterion. For example, certain content sources 12, 14 may be charged a greater fee by the scheduler 10, in return for being accorded a higher priority in the distribution of content data over the network. These priorities can be stored in memory 32 in the scheduler 10 to be factored into the calculation of transmission parameters for each content source 12, 14 transmission.

In step 102, the scheduler 10 determines the distribution schedules for each of the content sources 12, 14 that have requested distribution of content data. Referring to the flowchart of FIG. 4, the process for determining distribution schedules is illustrated according to one embodiment of the invention. In step 200, the scheduler 10 obtains the priority level of the content sources 12, 14 requesting transfer of data to the replicated servers 16, 18, 20. The scheduler 10 may obtain the priority levels associated with each content source 12, 14 from main memory 32, or in other embodiments, can be obtain them from the request signals or via the network 24. Control is then routed to step 202 where the scheduler 10 sorts the high priority requests from the low priority requests. Note that this discussion hereinafter refers to the sorted high priority content sources, simply as "content sources." Control is then routed to step 204 where the scheduler 10 determines for each content source 12, 14, the amount of data requested for transmission by a desired delivery time. After the respective amounts of data have been obtained, in step 206, the scheduler 10 adds the amounts to obtain the total amount of content data to be transmitted by the high priority content sources.

Figure 4:
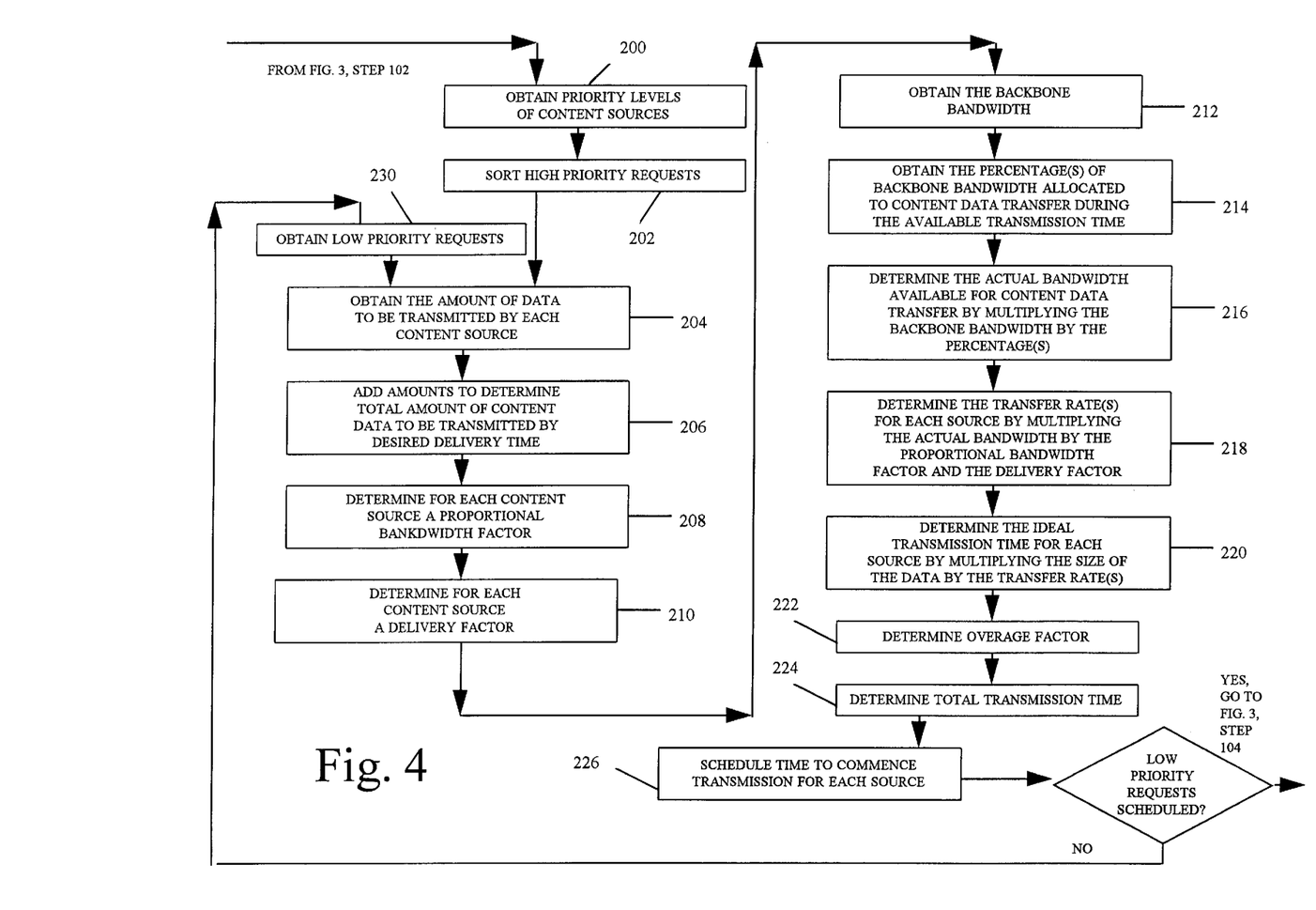
FIG. 4 is a flowchart of a process of determining distribution schedules for content sources.

In step 208, the scheduler 10 determines for each content source 12, 14, a proportional bandwidth factor. This factor relates to the ratio of the size of data to be transmitted by each content source 12, 14, respectively, to the total amount of data to be transmitted. Referring for example to Table 1 below, if *USA Today* is requesting transmission of 13,450 Kbytes and there are a number of other high priority content sources (i.e., *The Wall Street Journal, Barrons*, and *Time*) requesting transmission such that the total amount of data to be transmitted is 199,906 Kbytes, then the proportional bandwidth factor for *USA Today* is 13,450/199,906, or 0.067.

TABLE 1

| Content Data Source | Date of Request | Time of Request | Date of Delivery | Time of Delivery | Content Size in Kbytes | Priority Level |
|---|---|---|---|---|---|---|
| USA Today | 8:1:1996 | 8:30 PM | 8:2:1996 | 7:30 AM | 13450 | High |
| Wall Street Journal | 8:1:1996 | 8:45 PM | 8:2:1996 | 7:00 AM | 15798 | High |
| Golf Digest | 8:1:1996 | 8:55 PM | 8:2:1996 | 8:00 AM | 19247 | Low |
| WB Encyclopedia | 8:1:1996 | 9:05 PM | 8:2:1996 | 8:30 AM | 52355 | Low |
| Sports Illustrated | 8:1:1996 | 9:15 PM | 8:2:1996 | 7:00 AM | 15830 | Low |
| People | 8:1:1996 | 9:25 PM | 8:2:1996 | 8:00 AM | 45826 | Low |
| Barrons | 8:1:1996 | 9:30 PM | 8:2:1996 | 7:15 AM | 83937 | High |
| NASA | 8:1:1996 | 9:35 PM | 8:2:1996 | 7:45 AM | 953672 | Low |
| Time | 8:1:1996 | 9:45 PM | 8:2:1996 | 7:30 AM | 86721 | High |

After obtaining a proportional bandwidth factor for all of the content sources 12, 14, control is routed to step 210, and the scheduler determines a delivery factor for each content source 12, 14. The delivery factor is basically a time factor. The scheduler 10 determines for each content source 12, 14, an available transmission time, which is a time interval starting with the time that transmission is to commence and ending with the requested delivery time. The scheduler then determines the mean of the available transmission times of all the content sources 12, 14. The delivery factor is thus determined for each content source 12, 14, by the ratio of the mean available transmission time to its available transmission time. Referring again to Table 1, for example, *USA Today* requests delivery of content data by 7:30 AM. Note that the desired delivery time for other high priority content sources, such as *The Wall Street Journal, Barrons*, and *Time* are as follows: 7:00 AM, 7:15 AM, and 7:30 AM, respectively. Assuming that transmission is to commence at 10:00 PM of the prior day, the available transmission time for *USA Today*, is thus 8.5 hours, as that is the amount of time between the time transmission begins, 10 PM until the desired delivery time, 7:30 AM. Referring still to Table 1, note that for *The Wall Street Journal*, there are 8 hours, for *Barrons* there are 8.25 hours, and for the *Time* there are 8.5 hours. Taking the mean of each hour value for the above-noted content sources, we obtain 8.31 hours. Thus, the delivery factor for *USA Today* is 8.31/8.5, or 0.97. *The Wall Street Journal* will have a larger delivery factor, given that there is less time during which delivery can be completed by the desired delivery time, that is, 8 hours, as compared to 8.5 hours available for the content source, *USA Today*. The delivery factor for *The Wall Street Journal* is thus 8.31/8 or 1.03. The larger the delivery factor, the greater the bandwidth to be accorded to that particular content source to achieve completion of transmission by its earlier delivery time.

After obtaining the delivery factor, control is then routed to step 212, and the scheduler 10 determines the bandwidth of the pathway through the network 24 at the times of day corresponding to the available transmission times of each content source 12, 14. The pathway bandwidth is typically the total network bandwidth over the predetermined period. The scheduler 10 then determines, in step 214, the percentage of the total network bandwidth that is allocated to content data transfer at the times of day corresponding to the available transmission times. Referring again to the above example relating to *USA Today*, the scheduler obtains from a main memory 32, or a network manager located on the network 24, the percentage of bandwidth allocated to content data transfer from the time transmission is to commence, 10:00 PM, until the time that delivery is to be completed, 7:30 AM.

Figure 7:
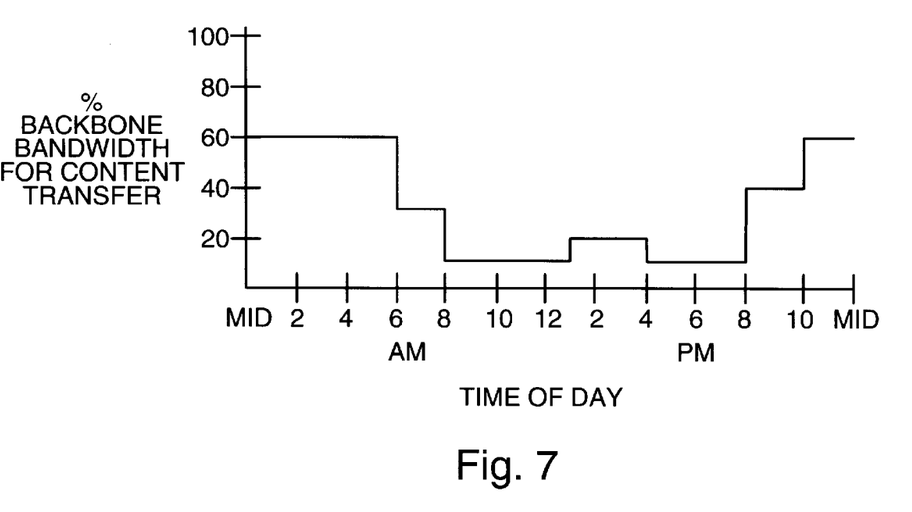
FIG. 7 is a diagram of a bandwidth profile for a twenty-four hour period.

Given that the percentage of bandwidth allocated to content data transfer may vary at certain times within the available transmission time, the scheduler 10 also determines if differing percentages exist during such time, and the duration of time that each percentage is available. Referring to FIG. 7, which shows the typical bandwidth profile for a 24 hour period, note that between 10:00 PM and 6:00 AM, 60% of the network bandwidth is allocated to content data transfer. Where percentages vary at different times throughout the available transmission times, as will be further described, the scheduler 10 determines a different transfer rate for each duration of time that a different percentage applies. The scheduler 10, having determined the percentages and respective durations of time during which each percentage is available, stores this data in memory 32 for ease of later retrieval.

Control is then routed to step 216 where the scheduler 10 multiplies the pathway bandwidth by the percentage of bandwidth allocated to content data transfer, or percentages, if the percentage varies during the available transmission time. The resulting value(s) obtained is the bandwidth that is available for content data transfer for a time period during the available transmission time, hereinafter referred to as the actual bandwidth. For example, if the pathway bandwidth is 1.544 Mbps, and 60% of the pathway bandwidth is available for data transfer between 10:00 PM and 6:00 AM, the scheduler 10 determines that the actual bandwidth for data content transfers from the content sources 12, 14 during this interval is 926.4 Kbps. The actual bandwidth can be stored in memory 32 for later retrieval.

Control is then routed to step 218 and the scheduler 10 determines the transfer rate for each content source 12, 14 by multiplying each actual bandwidth obtained for the available transmission time, by the proportional bandwidth factor and the delivery factor. Referring again to FIG. 7 and the examples above relating to USA Today, the data transfer rate during 10:00 PM and 6:00 AM would be calculated by the scheduler 10 by multiplying 926.4 Kbps, by a proportional bandwidth factor of 0.067 and a delivery factor of 0.97, to obtain 60.2 Kbps. Given that the data transferred by USA Today is to be delivered by 7:30 AM, a different transfer rate will apply between 6:00 AM and 7:30 AM due to the decrease in the percentage of available bandwidth to 30%, occurring at 6:00 AM. The actual bandwidth during this time period is calculated by multiplying 1.544 Mbps by 0.3, which is, 463.2 Kbps. The transfer rate during this time period is thus calculated by multiplying 463.2 by 0.067 and 0.97, which is 30.1 Kbps. Thus, it is clear that the transfer rate decreases as the percentage of bandwidth allocated to content data transfer decreases.

Once the transfer rate for each content source 12, 14 has been obtained, control is routed to step 220 where the scheduler 10 determines the ideal transmission time, that is, the amount of time it would take for each source to transmit the amount of data requested. The ideal transmission time is determined by multiplying the amount of data by the data transfer rate assigned to the content source 12, 14. Referring still to the example above, if USA Today intends to transmit 13,440 Kbytes of data, and the data transfer rate between 10:00 PM and 6:00 AM is 60.2 Kbps, the scheduler 10 multiplies 13,440 Kbytes by the transfer rate of 60.2 Kbps, to obtain an ideal transmission time of 3.7 minutes. For this example, a determination of the transmission time using the transfer rate assigned between 6:00 AM and 7:30 AM is moot, as transmission will likely be completed within the first hour of transmission. Where each content source 12, 14 has been assigned a different transfer rate and each desires to transmit a different amount of data, the ideal transmission time for each content source 12, 14 will differ. As will be further discussed, the ideal transmission time determined for each source is typically extended, as transmission errors are generally anticipated. The amount of time to be added to the ideal transmission time is determined by an overage factor, to be further described.

After determining the ideal transmission time for each content source 12, 14, control is routed to step 222 and the scheduler 10 determines the overage factor, which is the amount of time that should be added to the ideal transmission time calculated in step 220, to account for errors that may occur during data transmission. The overage factor is typically network-specific, and can be influenced by the amount and degree of typical, recurring, or expected transmission errors. For example, a network having few recurring errors that are minor in nature, may have an overage factor of 1.5, whereas a network having many recurring errors of a serious nature, may have an overage factor of 5.0. Using the former example, an overage factor of 1.5 indicates that an additional time equal to about one and a half times the ideal transmission time calculated in step 220, should be added to the ideal transmission time. In step 224, the total transmission time is calculated, using the overage time. The additional time needed for potential transmission errors is first calculated by multiplying the ideal transmission time by the overage factor. Using the example above, if the ideal transmission time is 3.7 minutes, then the overage factor would be 1.5 multiplied by 3.7, yielding an additional time of about 5.5 minutes. This additional time is added to the ideal transmission time determined in step 220, yielding a total transmission time of 9.2 minutes. The total transmission time can be stored in memory 32 in the scheduler 10 and included in the distribution schedule created for each content source 12, 14.

Having obtained the transfer rate and the total transmission time for each content source 12, 14, the scheduler, in step 226, sets the start time for which each content source 12, 14 should commence transmission so that it can be completed by the desired delivery time. This start time can be predetermined by the scheduler as the time that transmission is to begin for all sources that have earlier placed their requests. In other embodiments to be discussed below, the start time can be determined per content source, by subtracting from the desired delivery time, the total transmission time determined in step 224. For purposes of discussion however, the predetermined start time will be the same for each of the content sources, provided that they have placed a request by a certain time. For example, referring to FIG. 7, above, all requests are placed by 9:45 PM in order to be scheduled for transmission at 10:00 PM. Once the start time is determined and stored in memory 32 with the above-stored parameters, the distribution schedule for each content source 12, 14 is generally complete.

Control is then routed to step 228 and the scheduler determines whether distribution schedules for low priority requests have been determined. If they have not yet been determined, control is routed to step 230 and the low priority requests are retrieved from memory 32. The above-described process of FIG. 4 is then re-executed to determine the distribution schedules for each of the low priority content sources. After distribution schedules have been calculated for the low priority content sources, control is routed from step 228 back to FIG. 3, step 104.

Referring to FIG. 3, in step 104, the scheduler 10 determines whether the distribution schedules calculated in the flowchart of FIG. 4 can be accommodated. This determination typically involves two sub-determinations further described in the flow charts of FIG. 5A and FIG. 5B. In one of such sub-determinations, the scheduler 10 determines whether the total transmission time scheduled for data transmission for each of the content sources 12, 14 can be met within the time that transmission is to commence and the time that delivery is to be made, that is, the available transmission time. In the other sub-determination, the scheduler 10 determines whether a sufficient number of multicast addresses exist for the number of content sources 12, 14 requesting distribution.

Figure 5A:
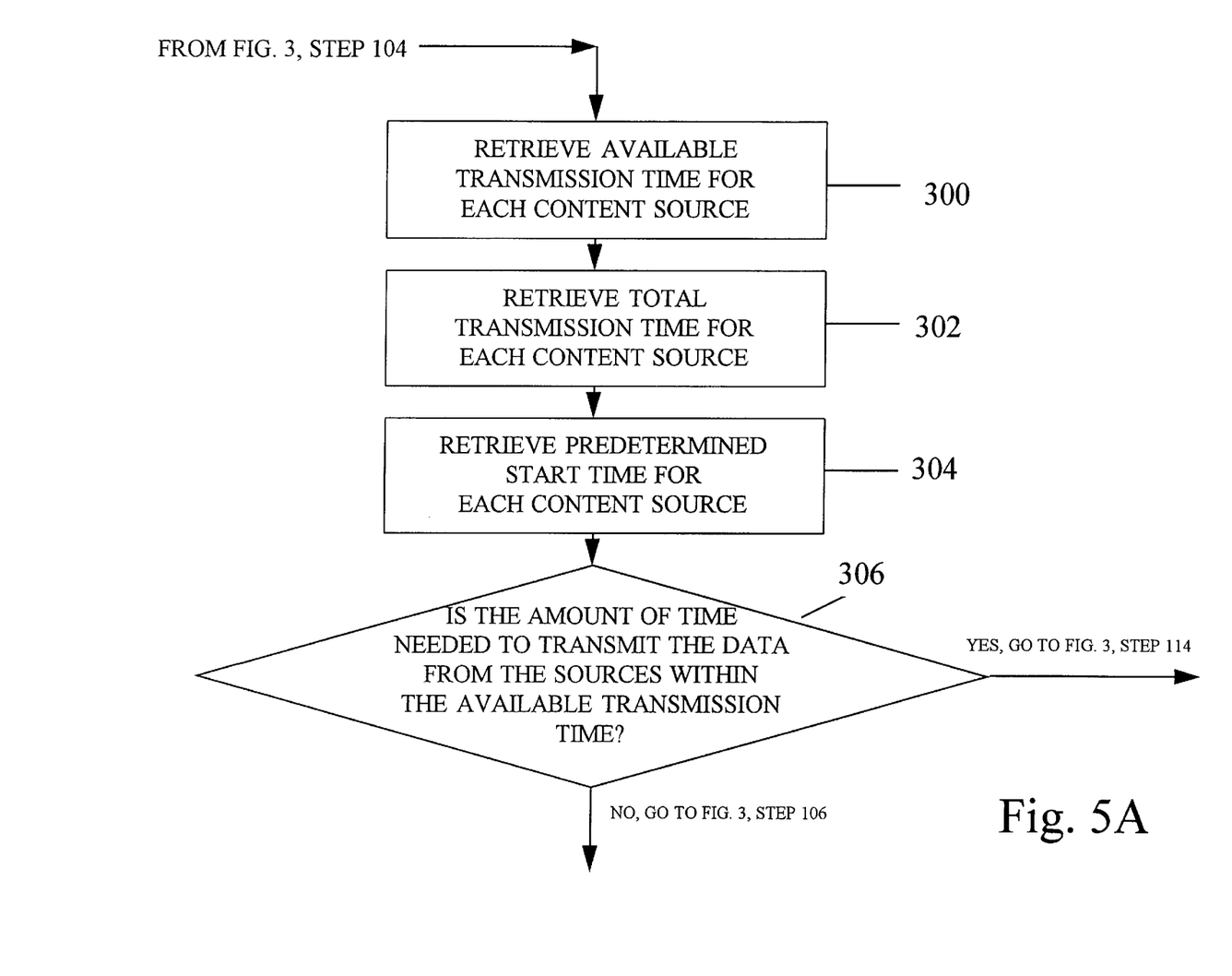
FIG. 5A is a flowchart of a process of determining whether distribution schedules can be accommodated within an available transmission time.
Figure 5B:
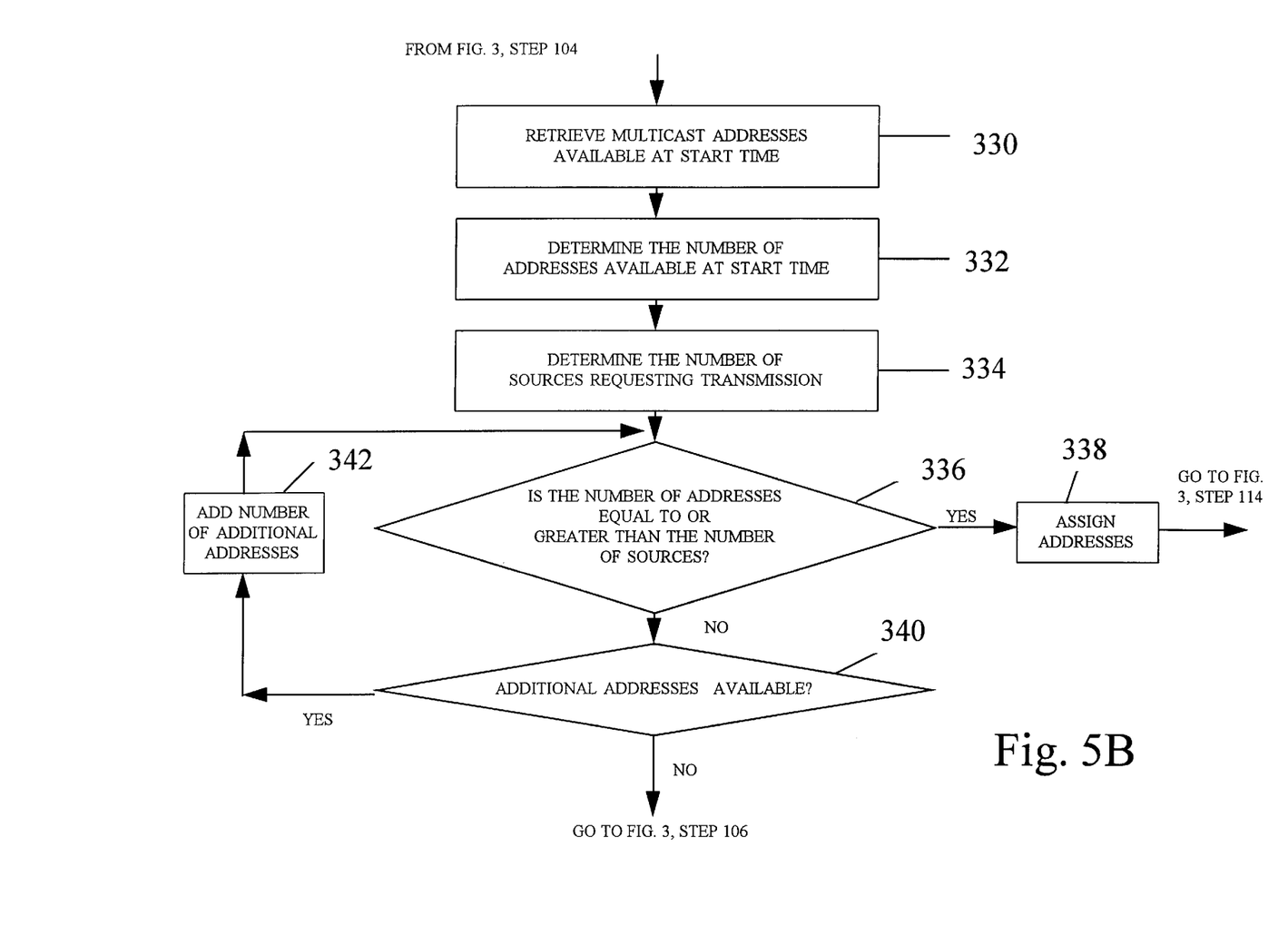
FIG. 5B is a flowchart of a process of determining whether distribution schedules can be accommodated with the number of available multicast addresses.

Referring to FIG. 5A, the steps for determining whether the total transmission time is within the predetermined period, commences with the scheduler 10, in step 300, retrieving from memory 32, the available transmission time for each content source. Referring again to Table 1 above, USA Today has an available transmission time of 8.5 hours. After retrieving data relating to the available transmission time, control proceeds to step 302 and the scheduler 10 retrieves from memory 32, the total transmission time, which as shown in the example above is 9.2 minutes. Control is then routed to step 304 and the scheduler retrieves from memory the predetermined start time, which, as stated above, is the time at which each source 12, 14 begins transmitting data. Control is then routed to step 306 where the scheduler 10 determines whether the total transmission time needed to transmit the data is within the interval of the available transmission time. Referring again to the above example, if the total transmission time for USA Today is 9.2 minutes, and there are 8.5 hours of available transmission time, assuming transmission is to commence at 10:00 PM, then the distribution schedule for that USA Today can be completed within the available transmission time. Where a distribution schedule can occur within the available transmission time, control is routed to FIG. 3, step 114. The scheduler 10 then distributes transmission instructions to the content sources 12, 14, after multicast addresses have been assigned, as further described below in FIG. 5B. If the total transmission time is greater than the available transmission time control is routed back to the flowchart of FIG. 3, step 106.

Where a distribution schedule can occur within the available transmission time, control is then routed to the flowchart of FIG. 5B. As shown in step 330, the scheduler 10 retrieves from memory 32 the set of multicast addresses that are available at the transmission start time. It is important to note that the multicast addresses can and may be configured for use in semi-permanent sessions, or configured for single sessions. In a semi-permanent session, the multicast address is assigned to a content source 12, 14 semi-permanently, that is, for each duration of the time that the content source 12, 14 requests transmission of data. The content source 12, 14 is therefore assured that an address is regularly available whenever it requests data transfer over the network. To obtain an assigned semi-permanent multicast address, a high priority content source 12, 14 may be charged a user fee. Alternatively, multicast addresses can be assigned on a session-by-session basis dynamically. In this case, the availability of multicast addresses is based on priority and the time of the request, and are assigned after release by a prior content source 12, 14 at the end of a session.

In step 332 the scheduler 10 determines the number of multicast addresses available at the transmission start time. This number can be obtained from main memory 32 or from a network manager. For purposes of discussion only, the contents sources 12, 14 use session-based multicast addresses for transmission, and therefore that the number of available multicast addresses are those addresses which are used on a session-by-session basis. It is important to note that where semi-permanent multicast addresses have been assigned, there is typically no need for the content sources 12, 14 to request a multicast address. Upon obtaining the number of addresses, control is routed to step 334 where the scheduler retrieves from memory 32 the number of content sources 12, 14 requesting data transmission at the desired delivery time. After obtaining the number of content sources 12, 14 requesting data transmission, control is routed to step 336 where the scheduler 10 determines whether the number of multicast addresses are equal to or greater than the number of content sources 12, 14 that require session-based multicast addresses. If the scheduler makes this determination affirmatively, that there exists a sufficient number of addresses to accommodate all of the pending requests, addresses are assigned in step 338. Control is then routed to FIG. 3, step 114.

Should the scheduler 10 determine that the number of content sources 12, 14 is greater than the number of available addresses, control is routed to step 340. In this step, the scheduler 10 determines the number, if any, of additional addresses that are currently being made available for reuse. In this embodiment, a session-based address can again made available to a content source 12, 14 after completion of a previous data transmission from another content source 12, 14 using that address. If the scheduler 10 has received an indication that additional addresses are available, control is routed to step 342 and the number of such addresses are added to the number of addresses previously determined in step 332. Control is then routed again to step 336 to determine whether the increased number of addresses is greater than the number of content sources 12, 14. If the scheduler 10 makes this determination affirmatively, control is routed to step 338 where addresses are assigned. If the scheduler 10 determines in step 336, that the number of addresses remains greater than the number of sources 12, 14, the scheduler 10 again determines in step 340 if additional addresses have been made available in the time that elapsed since the last determination of reusable addresses was made. If the scheduler 10 determines that no new addresses have been made available, control is then routed to step 106 of FIG. 3.

Referring again to FIG. 3, in step 106 the scheduler 10 notifies the content sources 12, 14 that their request either will not be accommodated at all or that it will only be partially accommodated. The notification of partial accommodation generally occurs for example, where a sufficient number of multicast addresses are available, but the scheduler 10 determines that the total transmission time for that content source 12, 14 is not within the available transmission time. After notifying the content sources 12, 14 that their requests cannot be accommodated, or can only be partially accommodated, the scheduler may further indicate that such content sources 12, 14 should request a new delivery time.

In step 108, the content sources 12, 14 that have been notified of non-accommodation determine whether the notification is acceptable. If acceptable, the content sources 12, 14 signal the scheduler 10 that their requests can be put on hold, and control goes to step 114 where the scheduler 10 distributes instructions to those content sources 12, 14 whose requests for transmission of data at the desired delivery time can be accommodated. These sources 12, 14 are generally those accorded the highest priority. In the event that a content source indicates that the notification is not acceptable, control is routed to step 109, where the scheduler determines if the content source 12, 14 is requesting a new delivery time. If an affirmative determination is made, control is again routed to step 102 and the scheduler recalculates the distribution schedule for that content source 12, 14 based on the new delivery time. If the content sources 12, 14 have not requested a new delivery time, that is, the content sources 12, 14 indicate that their initial request should be accommodated, control is routed to step 110 and the scheduler 10 determines whether additional resources on the network can be used.

In step 110, the scheduler 10 determines whether additional network resources can be used to satisfy a delivery request. The scheduler thus determines the emergency overage bandwidth during the available transmission time. Where data relating to the emergency overage bandwidth is stored in memory 32 at the scheduler 10, the scheduler 10 simply retrieves it therefrom. Where such data is not stored in memory 32, the scheduler 10 may access the network to obtain it. If emergency overage bandwidth is available, control is routed to step 102, and the distribution schedules of such content sources 12, 14 are determined with the additional emergency overage bandwidth.

After the distribution schedules have been determined, control is again routed to step 104. In this step, the scheduler 10 determines whether the total transmission time during which data transfer is scheduled to occur is within the available transmission time. Additionally, the scheduler 10 again determines whether a sufficient number of multicast addresses exist. If data transfer cannot occur within the available transmission time, or if an insufficient number of addresses exist, control is routed to step 106 and the content sources 12, 14 are notified that their requests will not be accommodated. As stated above, such content sources 12, 14 may request a new delivery time as set forth in step 109. In this case, control would again be routed to step 102 and distribution schedules would be recalculated for such time.

In the event that the period during which data transmission would occur is within the permissible time period, and a sufficient number of addresses exist, control is routed to step 114. In this step, the scheduler 10 distributes transmission instructions to the content sources 12, 14. These instructions include the time to start transmitting the content data to the replicated servers 16, 18, 20, the transfer rate, typically in bits/second, the overage factor, and the multicast address assigned.

After receiving the above instructions, the content sources 12, 14 transmit content data at the scheduled time as shown in step 116, for distribution to the replicated servers 16, 18, 20. As the content sources 12, 14 finish transmitting the data to the replicated servers 16, 18, 20, a notification of completion is sent to the scheduler 10. Upon receipt at the scheduler 10 as given by step 118, the scheduler 10 determines whether the notification of completion indicates that the content source 12, 14 is ahead of schedule or behind schedule. If the notification suggests that the content source 12, 14 has completed transmission ahead of schedule, modifications and adjustments to start times, overage factors and/or transfer rates of other content sources 12, 14 can be made, as shown in step 120. In such a scenario, certain content sources 12, 14 may be granted either a higher transfer rate, or if their request had earlier been denied in part, the content sources 12, 14 may be granted the ability to transmit a greater amount of data than originally scheduled to transmit. Typically such modifications and adjustments are sent to the content sources 12, 14 that have not yet finished transmitting data.

In the event that the notification received in step 118 suggests that a content source 12, 14 was not successful in delivering content data to all of the replicated servers 16, 18, 20, the scheduler 10 adjusts the distribution schedule for that content source 12, 14, and may, in turn, adjust the distribution schedules of other content sources 12, 14. Adjustments are typically made in response to causation data transmitted with the notification relaying the cause of the unsuccessful distribution. The causation data can indicate the existence of a link outage on the network, lack of resources at the replicated servers 16, 18, 20 to handle the incoming data, or simply an excessive error rate. If the content source 12, 14 that experienced the unsuccessful distribution attempt was previously assigned a high priority level, the scheduler may adjust the schedules of the low priority level content sources so that the high priority level content source can complete distribution to the replicated servers 16, 18, 20 by the desired delivery time.

In step 122, the scheduler 10 determines whether all appropriate adjustments to the distribution schedules have been made in response to the notifications received. If additional adjustments are needed, control is again routed to step 120 and such adjustments are made. If however, all adjustments have been attended to, control is routed to step 124 and scheduling of data transfer from the content sources is completed. The scheduler 10 typically remains idle until other notifications or requests are received.

Figure 6:
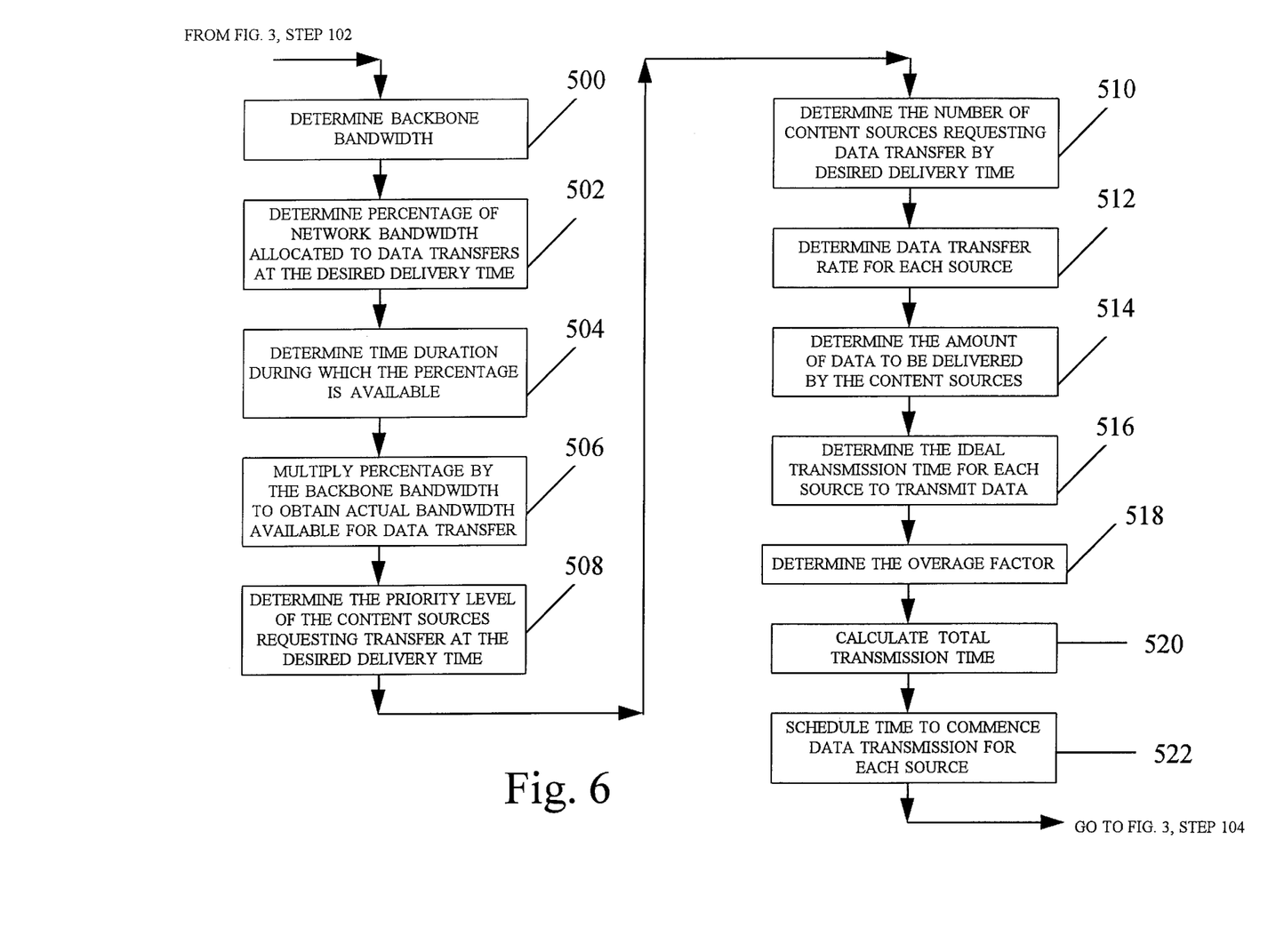
FIG. 6 is a flowchart of a process of scheduling data transmission operations in accordance with another embodiment of the invention.

Referring again to FIG. 3, step 102, still other methods of determining distribution schedules can be used. Referring to FIG. 6, in another embodiment of the invention, the distribution schedules are determined for each content source request, without first sorting the requests received from the high priority level content sources. In step 500, the scheduler determines the pathway bandwidth for the network 24 for a period of time beginning with the time the request was received by the scheduler 10, and ending with the desired delivery time. Using the parameters in the example above, if *USA Today* transmits a request at 8:30 PM for 7:30 AM delivery the next day, the scheduler 10 may determine the pathway bandwidth for that time period. This bandwidth can be stored in memory 32 for later retrieval. The scheduler 10 then determines, in step 502, the percentage of the total network bandwidth that is allocated to content data transfer at times during such time period. As described above in the discussion of Table 2, this percentage typically fluctuates during a 24 hour period.

Given that data transfer will commence prior to the desired delivery time, the scheduler 10, in step 504, determines the duration of time prior to the desired delivery time during which the percentage or percentages are available, hereinafter referred to as the periods of network bandwidth availability. Referring again to FIG. 7, the scheduler may obtain from a network manager that 40% of the available bandwidth is dedicated to data transfer between 8:30 PM and 10:00 PM, that 60% is available between 10:00 PM and 6:00 AM, and that only 30% is dedicated to data transfer between 6:00 AM and 8:00 AM. Control is then routed to step 506, where a multiplication of the percentage(s) obtained in step 502 by the pathway bandwidth obtained in step 500, is carried out yielding the actual bandwidth(s) available for content data transfer during this period.

After the scheduler determines the actual bandwidth(s), control is routed to step 508 and the scheduler 10 determines the priority level of the content sources 12, 14 requesting transfer of data to the replicated servers 16, 18, 20 at the desired delivery time. The scheduler 10 can obtain the priority levels from the request signal, from main memory 32, or from the network 24. After the priority levels have been determined and stored in memory, control is routed to step 510, and the scheduler 10 determines the number of content sources 12, 14 requesting data transfer by the desired delivery time. In step 512, the scheduler 10 divides the actual bandwidth during the time period, by the number of content sources 12, 14 requesting transmission with the time period. Where the number of content sources 12, 14 are of equal priority level, the transfer rates are easily determined in this manner. Where the content sources have differing priority levels however, the scheduler 10 can account for such differing levels by weighting the number of high priority content sources, resulting in an award of greater bandwidth to the high priority content source(s).

After the transfer rates for the content sources 12, 14 have been determined, control is routed to step 514 and the scheduler 10 determines the amount of data to be delivered by each content source 12,14. The scheduler 10 typically obtains such data from the request signal and stores it in memory 32 for later retrieval. Control is then routed to step 516 where the scheduler 10 determines the amount of time it would take for each source to transmit the amount of data, the ideal transmission time. The ideal transmission time is determined by multiplying the amount of data by the data transfer rate assigned to the source. The ideal transmission time is then stored in memory 32 and included in the distribution schedule created for each content source 12, 14.

After determining the ideal transmission time for each content source 12, 14, control is routed to step 518 and the scheduler 10 determines the overage factor, which as described above, is the amount of time that should be added to the ideal transmission time calculated in step 516, to account for errors that may occur during data transmission. In step 520, the total transmission time is calculated as described above, using the overage factor. The total transmission time can then be stored in memory 32 in the scheduler 10 and included in the distribution schedule created for each content source 12, 14.

Having obtained the transfer rate and the total transmission time for each content source 12, 14, the scheduler in step 522, sets the start time for which each content source 12, 14 should commence transmission so that it can be completed by the desired delivery time. This start time is determined by subtracting from the desired delivery time, the total transmission time determined in step 520. For example, if the desired delivery time is 7:30 AM and the total transmission time is three hours, the content source will be assigned a start time of at least 4:30 AM. Once the start time is determined and stored in memory 32 with the above-stored parameters, the distribution schedule for each content source 12, 14 is generally complete.

In accordance with this embodiment, if each request cannot be accommodated after distribution schedules have been calculated, due to a failure to meet the sub-determinations of FIG. 5A and FIG. 5B, the scheduler 10 may sort the high priority content sources and accommodate them before accommodating the low priority content sources. For example, where a determination is made in the process described in the flowchart of FIG. 5A, that the total transmission time falls outside of the available transmission time, the schedules for the high priority sources are recalculated in accordance with the flowchart of FIG. 6, with the number content sources being only the high priority content sources. Where a determination is made in the process described in the flowchart of FIG. 5B, that the number of multicast addresses are less than the number of requesting content sources, the available addresses can be assigned to the high priority sources only. Similarly, where distribution schedules cannot be accommodated, any available emergency overage bandwidth obtained in the process described in the flowchart of FIG. 3, is awarded to high priority content sources before it is awarded to the low priority content sources.

The steps and functionality described herein preferably is achieved by one or more computer programs running on one or more of the general purpose computers described previously. It is possible as an alternative to achieve the steps and functionality described herein with specialized hardware. When provided as software running on a general-purpose computer, as preferred, the invention can run on top of any one of a variety of operating systems.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for coordinating data transmission over a computer network, comprising:
    obtaining, at a network resource scheduler, availability of network bandwidth for data transmission by one or more content sources on the network wherein each content source has a priority;
    receiving, at the network resource scheduler from each of requesting ones of the content sources, transmission request information including a requested delivery deadline time for data transmission and an amount of data transmission;
    determining, at the network resource scheduler, based on at least the priority of the requesting content sources and at least some of the transmission request information from each requesting content source, a time to begin data transmission, a rate at which to transmit data, and a network bandwidth available to each requesting content source such that data transmission by each requesting content source is completable by the requested delivery deadline time; and
    sending, from the network resource scheduler to each requesting content source, the time to begin data transmission and the rate at which to transmit data.

2. The method of claim 1 further comprising:
    transmitting, from each requesting content source, data over the network at the time and rate sent from the network resource scheduler.

3. The method of claim 2 wherein the transmitting step comprises a multicast transmission to one or more replicated servers over the network.

4. The method of claim 1 wherein the obtaining step comprises obtaining, at the network resource scheduler, availability of network bandwidth for data transmission by one or more content sources on the network wherein at least one of the content sources is co-resident with the network resource scheduler.

5. The method of claim 1 wherein the obtaining step further comprises obtaining, at the network resource scheduler, the priority of at least some of the content sources on the network.

6. The method of claim 1 wherein the receiving step further comprises receiving, at the network resource scheduler from each requesting content source, transmission request information including security parameters.

7. The method of claim 1, wherein determining the rate at which to transmit data for each of the requesting ones of the content sources further comprises:
    determining a pathway bandwidth at times prior to the requested delivery deadline time;
    determining a percentage bandwidth allocated to the data transmission at times prior to the requested delivery deadline time;
    determining, using the pathway bandwidth and the percentage bandwidth, the actual network bandwidth allocated to data transmission; and
    determining, using the actual network bandwidth allocated to data transmission, the rate at which to transmit data for each of the requesting ones of the content sources.

8. The method of claim 7, wherein determining the rate at which to transmit data for each of the requesting ones of the content sources further comprises:
    determining the amount of data requested for data transmission by each of the requesting ones of the content sources;
    determining a total amount of data requested for transmission;
    determining, using the amount of data requested for data transmission by each of the requesting ones of the content sources and the total amount of data requested for transmission, a proportional bandwidth factor for each requesting ones of the content sources; and
    determining, using the actual network bandwidth allocated to data transmission and the proportional bandwidth factor for each requesting ones of the content sources, the rate at which to transmit data for each of the requesting ones of the content sources.

9. The method of claim 8, wherein determining the rate at which to transmit data for each of the requesting ones of the content sources further comprises:
    determining a length of a time interval when data is available for data transmission for each of the requesting ones of the content sources;

determining a mean of the lengths of the time intervals when data is available for data transmission for each of the requesting ones of the content sources;

determining, using each of the lengths of the time intervals when data is available for data transmission for each of the requesting ones of the content sources and using the mean of the lengths of the time intervals when data is available for data transmission, a delivery factor for each of the requesting ones of the content sources;

determining, using the actual network bandwidth allocated to data transmission, the proportional bandwidth factor for each requesting ones of the content sources, and the delivery factor for each of the requesting ones of the content sources, the rate at which to transmit data for each of the requesting ones of the content sources.

10. The method of claim 9 further comprising determining the rate at which to transmit data for each of the requesting ones of the content sources by multiplying the actual network bandwidth by the proportional bandwidth factor and the delivery factor.

11. The method of claim 10 further comprising determining a transmission time duration for each of the requesting ones of the content sources by multiplying the transfer rate by the amount of data requested for data transmission.

12. The method of claim 11 further comprising determining for each requesting ones of the content sources whether the transmission time interval when data is available for transmission is within the time interval when there is bandwidth available for data transmission, and where the transmission time interval when data is available for transmission is not within the time interval when there is bandwidth available, determining whether emergency overage bandwidth is available.

13. The method of claim 12 further comprising:
determining the availability of multicast addresses for the number of requesting content sources; and
sending, with the time to begin data transmission and rate at which to transmit data, a multicast address to the requesting ones of the content sources.

14. A system for coordinating data transmission over a computer network, comprising:
means for obtaining availability of network bandwidth for data transmission by one or more content sources on the network wherein each content source has a priority;
means for receiving, from each of requesting ones of the content sources, transmission request information including a requested delivery deadline time for data transmission and a size of data transmission;
means for determining, based on at least the priority of the requesting content sources and at least some of the transmission request information from each requesting content source, a time to begin data transmission, a rate at which to transmit data, and a network bandwidth available to each requesting content source such that data transmission by each requesting content source is completable by the requested delivery deadline time; and
means for sending, to each requesting content source, the time to begin data transmission and the rate at which to transmit data.

15. The system of claim 14 further comprising means for transmitting, from each requesting content source, data over the network at the time and rate sent from the sending means.

16. The system of claim 14 wherein the obtaining means is also for obtaining the priority of at least some of the content sources on the network.

17. The system of claim 14 wherein the receiving means is also for receiving, from each requesting content source, transmission request information including security parameters.

18. The system of claim 14 wherein the receiving means is also for receiving, from each requesting content source, notification of delivery of transmission.

19. The system of claim 14 wherein the means for obtaining availability of network bandwidth for data transmission further comprises means for obtaining availability of emergency overage bandwidth when data transmission by each requesting content source is not completable by the requested delivery deadline time.

20. A method for coordinating data transmission over a computer network, comprising:
communicating with at least one content source having data for transmission over the network;
obtaining form the content source data transmission request information including a requested delivery deadline time for data transmission and a size of data transmission;
determining a start time to begin data transmission, a transmission rate at which to transmit data, and a network bandwidth availability such that data transmission is completable by the requested delivery deadline time, the determination based on at least some of the transmission request information; and
sending to the content source the start time and the transmission rate for data transmission over the network, where data transmission is completable by the requested delivery deadline time.

21. The method of claim 20 wherein the determining step further comprises:
determining a network bandwidth allocated to data transmission from the content source; and
determining a duration for which the allocated network bandwidth is available.

22. The method of claim 21 further comprising:
determining an amount of time available to the content source for transmission of data; and
determining whether the transmission can occur within the amount of time available.

23. The method of claim 22 further comprising determining the availability of emergency overage bandwidth when transmission from the content source cannot occur within the amount of time available.

24. The method of claim 20, further comprising receiving notification from the content source when transmission is completed.

* * * * *